US012106617B2

(12) United States Patent
Gupta et al.

(10) Patent No.: US 12,106,617 B2
(45) Date of Patent: Oct. 1, 2024

(54) METHOD AND SYSTEM FOR AUTO GENERATING AUTOMOTIVE DATA QUALITY MARKER

(71) Applicant: CEREBRUMX LABS PRIVATE LIMITED, Haryana (IN)

(72) Inventors: Amit Gupta, Haryana (IN); Sandip Ranjhan, Delhi (IN); Sarika Gupta, Haryana (IN)

(73) Assignee: Cerebrumx Labs Private Limited, Haryana (IN)

( * ) Notice: Subject to any disclaimer, the term of this patent is extended or adjusted under 35 U.S.C. 154(b) by 196 days.

(21) Appl. No.: 17/687,181

(22) Filed: Mar. 4, 2022

(65) Prior Publication Data
US 2023/0058076 A1 Feb. 23, 2023

(30) Foreign Application Priority Data
Aug. 18, 2021 (IN) .............................. 202111037512

(51) Int. Cl.
| | |
|---|---|
| G07C 5/08 | (2006.01) |
| G06F 18/21 | (2023.01) |
| G06F 18/24 | (2023.01) |
| G06F 18/2415 | (2023.01) |
| G06F 18/243 | (2023.01) |
| G06N 3/04 | (2023.01) |
| G07C 5/00 | (2006.01) |

(52) U.S. Cl.
CPC ....... *G07C 5/0841* (2013.01); *G06F 18/2178* (2023.01); *G06F 18/2415* (2023.01); *G06F 18/243* (2023.01); *G06N 3/04* (2013.01); *G07C 5/008* (2013.01)

(58) Field of Classification Search
CPC ............ G06F 18/2178; G06F 18/2415; G06F 18/243; G06N 20/20; G06N 3/04; G06N 3/0464; G06N 3/082; G06N 3/088; G06N 3/09; G06N 5/01; G06V 10/7715; G06V 10/774; G06V 10/82; G06V 10/993; G06V 20/54; G07C 5/008; G07C 5/0841
See application file for complete search history.

(56) References Cited

U.S. PATENT DOCUMENTS

| | | | |
|---|---|---|---|
| 9,346,469 B2 * | 5/2016 | Glugla | F02D 41/2487 |
| 10,393,880 B2 * | 8/2019 | Arvidsson | B60W 50/0097 |
| 10,402,907 B2 * | 9/2019 | Bowne | G07C 5/0858 |

(Continued)

*Primary Examiner* — Tyler J Lee
(74) *Attorney, Agent, or Firm* — Matthew D. Thayne; Thayne and Davis LLC (57) ABSTRACT

The present invention provides a robust and effective solution to an entity or an organization for creating and standardizing an Automotive Data Quality Marker (ADQM) to determine/evaluate/predict the quality of automotive data such as Telematics, Body Control, ADAS, Diagnostics, Dashcams, and In-Vehicle Infotainment but not limited to the like generated by the vehicle (i.e., data source) using a machine learning (ML) engine associated with a processing unit. The machine learning engine comprises an amalgamation of machine learning algorithms to determine ADQM for a particular dataset. Data pertaining to vehicles is huge and repetitive. Re-training of the model for improved accuracy is a requirement as automotive data can be augmented with additional signals and data received and stored as trip objects on a regular basis.

17 Claims, 7 Drawing Sheets

(56) References Cited

U.S. PATENT DOCUMENTS

| | | | | |
|---|---|---|---|---|
| 11,676,430 | B2* | 6/2023 | Tammali | G06N 20/10 |
| | | | | 701/33.4 |
| 2014/0180723 | A1* | 6/2014 | Cote | G07C 5/008 |
| | | | | 705/4 |
| 2014/0222971 | A1* | 8/2014 | Cooper | H04L 67/1097 |
| | | | | 709/219 |
| 2015/0183440 | A1* | 7/2015 | Jackson | G07C 5/0808 |
| | | | | 701/32.4 |
| 2015/0224997 | A1* | 8/2015 | Glugla | B60W 50/06 |
| | | | | 701/33.1 |
| 2016/0078554 | A1* | 3/2016 | Cote | G06Q 40/08 |
| | | | | 705/4 |
| 2020/0242421 | A1* | 7/2020 | Sobhany | G06F 18/24 |
| 2020/0282999 | A1* | 9/2020 | Mizrachi | B60W 40/076 |
| 2020/0312134 | A1* | 10/2020 | Zhang | G08G 1/0141 |
| 2021/0133947 | A1* | 5/2021 | Li | G06V 20/56 |
| 2021/0219168 | A1* | 7/2021 | Liu | H04W 76/14 |
| 2021/0234932 | A1* | 7/2021 | Sobhany | H04L 67/52 |
| 2021/0319637 | A1* | 10/2021 | Tammali | H04W 4/027 |
| 2021/0343142 | A1* | 11/2021 | Lewis | G01S 19/01 |
| 2022/0292463 | A1* | 9/2022 | Brook | H04L 9/32 |
| 2023/0004901 | A1* | 1/2023 | Shaotran | H02J 7/0069 |

* cited by examiner

METHOD AND SYSTEM FOR AUTO GENERATING AUTOMOTIVE DATA QUALITY MARKER

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

A tectonic shift is taking place in the auto industry. Changes in technology, consumer behavior, and emerging markets are disrupting traditional modes of operation. Today's vehicles are more sophisticated and complex. Electronics, software, and online connectivity all pose new service, security, and privacy challenges and opportunities. In addition, the industry must contend with changes in the way cars are used, as well as how and where they are marketed. Typically, there can be 500+ data signals that are generated from a connected vehicle. Automotive data signals collected from different original equipment manufacturers (OEM), different Trade-Related Investment Measures (TRIM) within same OEMs and same make or model in different countries, varies significantly. Hence, there is a difference in the data provided by each source pertaining to number of collected signals, format and frequency of distributed data. Based on the industry and associated use cases, data consumers are interested to consume specific data signals at a particular frequency. Based on the source of data in vehicle, the data signals can be broadly be Telematics, Body Control, ADAS, Diagnostics, In-Vehicle Infotainment. Different categories of data have different value. A certain set of data signals can be used across industries and use cases, which makes them extremely valuable for the enterprises engaged in the business of data collection and distribution. Presence of these high value signals made available at a configurable frequency is an important factor in determining the value of data.

However, as of today there is no method for creating an Automotive Data Quality Marker (ADQM) for determining/evaluating the quality such as quality metric of automotive data such as Telematics, Body Control, ADAS, Diagnostics, and In-Vehicle Infotainment) generated by a vehicle (i.e., data source) through the incorporation of a machine learning algorithm. As a result, the data collection, handling, analysis, processing of such huge data becomes impossible to handle and erroneous results often occur. Further, there is no standardization or common taxonomy around the signals that shall be generated by connected car and at what frequency they shall be generated. The type of signals present in the data received is as important as the volume of data shared by the vehicle manufacturer. A quantitative mechanism to derive the quality of vehicle data along with the supported frequency is an important step towards seamless and transparent data value prediction. Currently, there is no standard set of high value signals in the automotive segment and the knowledge pertaining to these signals is scattered across the industry. Additionally, to derive useful insights of interest from the data, data consumers not only need specific data signals but shall need sufficient and balanced data samples at specific frequency, which are representative of large data population. Overall, quality of automotive data signals is a factor of presence of high value data signals, frequency of data samples and number of data samples. But none of the prior art discloses any method that are able to derive useful insights from the huge amount of data.

There is therefore, a need in the art to provide a system and a method that can overcome the shortcomings of the existing prior art and leverage machine learning/artificial intelligence for assessing the quality of vehicular data.

SUMMARY

An example embodiment of the present disclosure pertains to system facilitating an automatic generation of automotive data quality marker. The proposed system may include a plurality of Distributed Source Systems associated with a plurality of automotive data sources; a plurality of Distributed Storage Systems to store a set of data packets pertaining to any or a combination of numeric data generated in a vehicle during a trip and image dataset for example images captured through a dashboard camera during the trip; a processor; a data quality module coupled to the processor. The data quality module may be configured to receive the set of data packets from the distributed storage systems, the set of data packets may be received at a specific frequency and in specific quantity/numbers. The system may further include a Machine learning (ML) engine coupled to the processor, the ML engine configured to: extract a first set of attributes from the set of data packets received from the first computing devices associated with the plurality of automotive data sources, the first set of attributes pertains to automotive numeric data set; extract a second set of attributes from the set of data packets received from the first computing devices associated with the plurality of automotive data sources, the second set of attributes pertain to automotive image data set; and based on the first and the second set of attributes extracted, the ML engine may further determine an average score pertaining to quality of data in the set of data packets received, wherein the average score comprises the automotive data quality marker (ADQM); and then classify, based on the ADQM, the set of data packets related to the one or more automobiles among one or more pre-defined categories for quality marking.

Another example embodiment of the present disclosure pertains to a method facilitating auto generating automotive data quality marker. The method may include the step of receiving by a data quality module coupled to a processor, a set of data packets from a plurality of distributed storage systems associated with a plurality of automotive data sources, the set of data packets may be received at a specific frequency and in specific quantity/numbers; extracting, by an ML engine coupled to the processor, a first set of attributes from the set of data packets received from a plurality of first computing devices associated with the plurality of automotive data sources, the first set of attributes pertain to automotive numeric data set; extracting, by the ML engine coupled to the processor, a second set of attributes from the set of data packets received from the first computing devices associated with the plurality of automotive data sources, the second set of attributes pertain to automotive image data set; and based on the first and the second set of attributes extracted, determining, by the ML engine, an average score pertaining to quality of data in the set of data packets received, wherein the average score comprises the automotive data quality marker (ADQM) and then classifying, based on the ADQM, the set of data packets related to the one or more automobiles among one or more pre-defined categories for quality marking.

The present disclosure further pertains to a non-transitory computer readable medium comprising machine executable instructions that are executable by a processor. Upon such execution of the machine executable instructions, the processor may cause the non-transitory computer readable medium to: receive by a data quality module coupled to the processor, a set of data packets from a plurality of distributed storage systems associated with a plurality of automotive data sources, the set of data packets may be received at a specific frequency and in specific quantity/numbers; extract by an ML engine coupled to the processor, a first set of attributes from the set of data packets received from a plurality of first computing devices associated with the plurality of automotive data sources, the first set of attributes pertain to automotive numeric data set; extract, by the ML engine coupled to the processor, a second set of attributes from the set of data packets received from the first computing devices associated with the plurality of automotive data sources, the second set of attributes pertain to automotive image data set; and based on the first and the second set of attributes extracted, determine, by the ML engine, an average score pertaining to quality of data in the set of data packets received, wherein the average score comprises the automotive data quality marker (ADQM) and then classify, based on the ADQM, the set of data packets related to the one or more automobiles among one or more pre-defined categories for quality marking.

BRIEF DESCRIPTION OF DRAWINGS

Features of the present disclosure are illustrated by way of examples shown in the following figures. In the following figures, like numerals indicate like elements, in which.

The foregoing shall be more apparent from the following more detailed description of the invention.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

1. Overview

The present disclosure describes systems and methods for determining Automotive Data Quality Marker. The term "Automotive Data Quality Marker (ASQM)" is a universal marker to measure quality of automotive signals generated from a plurality of data sources. Automotive signals quality is an outcome of a plurality of factors ranging from critical data signals to the cost of collecting and distributing that data (sampling and sharing frequency).

The present invention provides a robust and effective solution to an entity or an organization for creating and standardizing an Automotive Data Quality Marker (ADQM) to determine/evaluate/predict the quality of automotive data such as Telematics, Body Control, ADAS, Diagnostics, Dashcams, and In-Vehicle Infotainment but not limited to the like generated by the vehicle (i.e., data source) using a machine learning (ML) engine associated with a processing unit. The machine learning engine comprises an amalgamation of machine learning algorithms to determine ADQM for a particular dataset. Data pertaining to vehicles is huge and repetitive. Re-training of the model for improved accuracy is a requirement as automotive data can be augmented with additional signals and data received and stored as trip objects on a regular basis.

2. System Description

Figure 1:
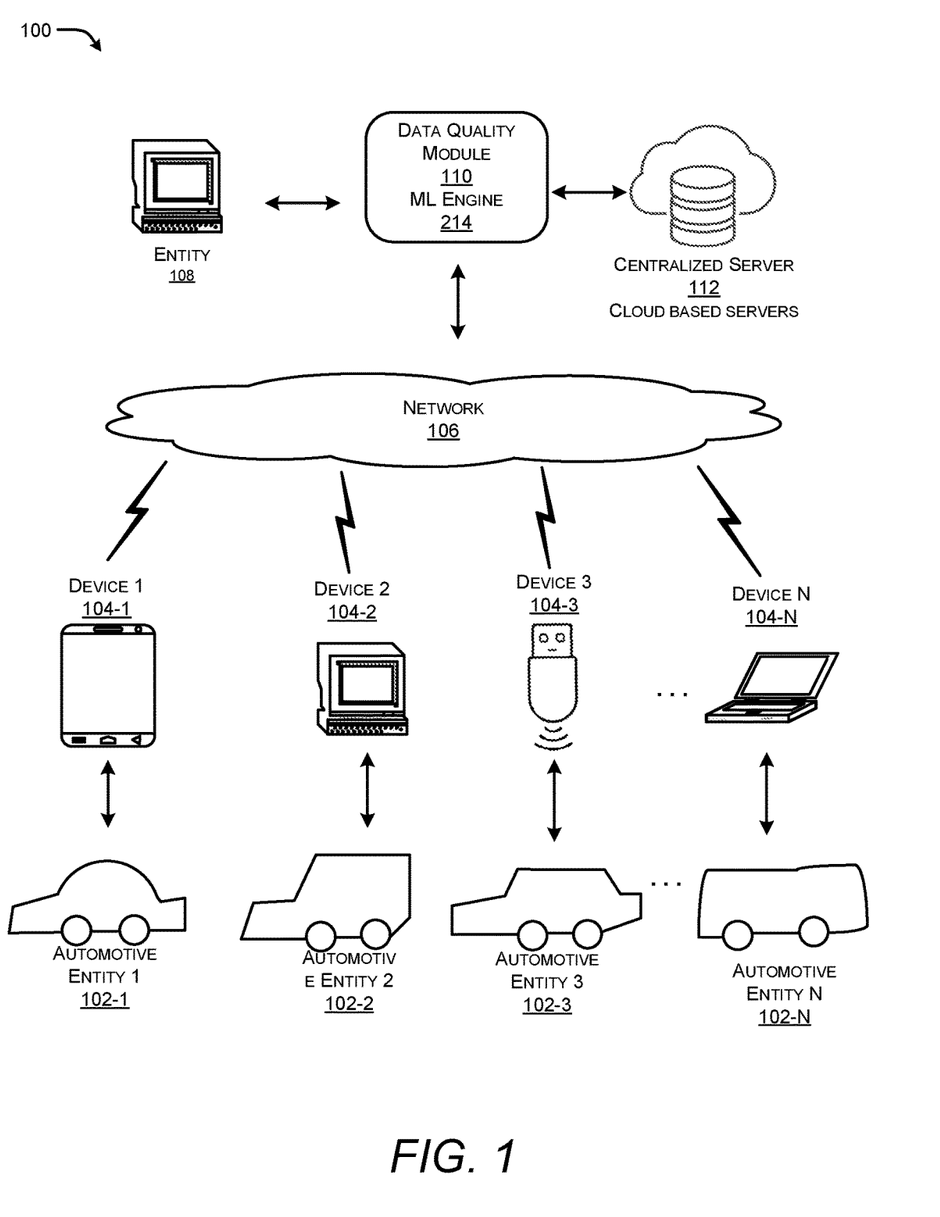
FIG. 1 illustrates a network architecture in which or with which data quality module of the present disclosure can be implemented, according to an example embodiment of the present disclosure.

FIG. 1 illustrates an auto generating automotive data quality marker system (100), according to an example embodiment of the present disclosure. In an example embodiment, the auto generating automotive data quality marker system (100), hereinafter referred to as system (100), amongst other components, includes a data quality module (110) (also referred to as data quality module 110 hereinafter) equipped with a machine learning (ML) engine (214) for facilitating collection and analyzing a set of data packets from one or more first computing devices (104) associated with plurality of automotive (102-1, 102 . . . 102-N) (collectively referred to as automotive (102) and individually referred to as automotive (102) to be stored in one or more second computing devices (108) associated with an entity. In an embodiment, the set of data packets may correspond to automotive data signals from the plurality of automotive (102) but not limited to it and may include automotive data signals corresponding to telematics, Body Control, ADAS, Diagnostics, in-Vehicle infotainment and the like.

In an example embodiment, the one or more first computing devices (104) may include a plurality of Distributed Source Systems. And the one or more second computing devices (108) may include a plurality of Distributed Storage Systems.

In an example embodiment, the one or more first computing devices (104) may include a plurality of Distributed Source Systems. And the one or more second computing devices (108) may include a plurality of Distributed Storage Systems.

In an example embodiment, the set of data packets may be stored as trip objects and the trip data is collected from internal and external vehicle sensors and collected by the first computing device (104) in at least two format such as numerical data stored as trip files and a set of image files captured during the trip but not limited to the like.

The data quality module (110) may be coupled to a centralized server (112). The data quality module (110) may also be operatively coupled to one or more first computing devices (104) and one or more second computing devices (108) through a network (106).

In an example embodiment, the data quality module (110) may receive the set of data packets from the first computing devices (104) associated with the plurality of automotive (102). The set of data packets may pertain to numeric data, for example signal data/values generated in the vehicle during a trip, image dataset for example images captured through dashboard camera during the trip but not limited to the like. The ML engine (214) of the data quality module (110) may extract a first and a second set of attributes from the set of data packets received from the first computing devices (104) associated with the plurality of automotive (102). The first set of attributes may pertain to automotive numeric data set while the second set of attributes pertain to automotive image data set. Based on the first and the second set of attributes extracted, the ADQM may be calculated by the ML engine (214). In a way of example and not as a limitation, supervised and unsupervised learning may be combined for predicting numeric data quality Numeric data Quality Marker (NDQM) and convolution neural network (CNN) model for predicting image data quality by using Image Data Quality Marker (IDQM). An overall Trip Data Quality Marker (TDQM) may be calculated by multiplying the weights assigned to numeric data and image data) with Numeric Data Quality Marker (NDQM) and Image Data Quality Marker (IDQM) respectively and summing them together.

In an example embodiment, the ML engine (214) further may calculate an overall ADQM using an average function but not limited to it, wherein the automotive data quality may be categorized/classified/quantified and may be interpreted as poor, average, good, and excellent based on the calculated ADQM values/range. For example, ADQM<=1 may be assigned as poor, 1<ADQM<=2 may be assigned as average, 2<ADQM<=3 may be assigned as good and 3<ADQM<=4 may be assigned as excellent.

In an example embodiment, the data quality module (110) may be configured to update the database every time and an end-to-end data completeness check for each of the data pipeline can be enabled and visualized by the data quality module (110) that may send the processed set of data packets to the second computing device (108).

In an example embodiment, an ADQM criteria may be based on the set of data packets received. In a way of example and not as a limitation, the personalized data may contain data pertaining to user identity of the vehicle such as VIN, email, telephone and the like. In the aggregated data no data signal that can lead to identify of end-user is shared. The personalized data may be much more useful in generating insights for specific consumer and driver behavior and can help support a number of use cases such as insurance, fleet but not limited to the like.

The set of data packets may be categorized into the personalized and the aggregated data but not limited to it.

In an example embodiment, key data features may be the automotive data signals, which may define the overall trip, vehicle health and driver behavior. These data signals may be used to generate insights at a vehicle level or aggregated across a set of vehicles. The signals may be divided into different feature categories and assigned priority based on the importance and usage of the signals.

In another example embodiment, data mode is the mode in which signals may be collected and shared. At least three data collection modes but not limited to it may be supported real-time, batch and historical. In real-time mode, signals may be collected and shared in real-time with a latency of 30-120 sec but not limited to it (except in crash), while the trip is active. In batch mode, signals may be collected in real-time but shared as batch files much after the trip is over. The real-time mode may be useful for supporting industry use cases where real-time tracking of the trip is required active trip tracking and urgent roadside help. The cost of supporting the real-time data mode may be 3× times higher than the batch mode due to data bandwidth requirements and real-time platform integration. While the real-time and batch data may be shared on a regular basis, historical data is signal data pertaining to past trips and may be shared on request.

In an example embodiment, data frequency is dependent on data sampling, aggregation and sharing rate. The data sampling rate is the rate at which individual automotive sensors are sampled in the vehicle. The data aggregation rate is the rate at which signal data is aggregated and shared from the vehicle to cloud. This rate determines the lag in reporting the event vs. the time of actual event occurrence. The more the data aggregation rate, the slower will be real-time data collection, impacting critical decisions and corrective actions. The data sharing rate is the rate at which the data is shared with the external partners, outside of the vehicle manufacturer network. This drives the latency between actual event occurrence in the car vs. reporting of event to external partners. Higher data sharing rate impacts the use cases that need critical response times. Each of the above data frequency parameter is important and impacts both the cost (due to additional cost of network, device and cloud resources) as well as value of data.

In an example embodiment, data validity may be used to determine validity of actual signal values and the factors that define the validity of data may include signal boundary checks to remove out of bound values, signal correlation and dependency. If signal correlation suggests deviation from normally correlated signals, data validity shall be adjusted. For example, speed and fuel efficiency is correlated and the data must show the same trends. Similarly, if a set of signals is dependent on another set, both set of signals have to be present in the dataset to give meaningful information. Another example may be GPS location signal values cannot be trusted to be accurate, if GPS accuracy signal is not available in the same dataset. In yet another example, speed and fuel efficiency are correlated and the data must show the same trends.

In an example embodiment, data skewness may be used to determine if the signal data received is balanced and has enough data to draw inferences. A balanced data set value is more valuable than a skewed dataset.

In an example embodiment, the ML engine (214) may include CNN modes for deriving the data quality marker for the image data. While the CNN modes are suited for processing image data, these models may be inefficient on numerical data. Hence, quality for numeric trip data may be predicted using machine learning algorithms such as Linear regression, logistic regression, Naive Bayes, kNN, random forest, Principle Component Analysis (PCA) and the like.

In an example embodiment, the ML engine (214) may generate a training dataset that must be representative of all the possible combinations of criterion driving the overall quality of the trip data. The 'numeric and the image training data may be collected for a plurality of trips covering various type of vehicles with different duration of the trips. The training dataset may further include different modes of collection such as real-time, batch, historical and mixed and the like, various combinations of data signals at varying frequencies (30 sec to 300 sec), personalized and aggregated data. The training data set must contain data for trips with personal information as well as trips with anonymized data.

In an example embodiment, the training dataset may be prepared using the existing dataset labelled quality marker value based on the actual quality of dataset and classifying ADQM according to a predefined set of instructions such as Poor, Average, Good, and Excellent and the like.

In an example embodiment, the one or more first computing devices (104), the one or more second computing devices (108) may communicate with the data quality module (110) via set of executable instructions residing on any operating system, including but not limited to, Android™, iOS™, Kai OS,™Linux, Android Auto, QNX and the like. In an embodiment, to one or more first computing devices (104), and the one or more second computing devices (108) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the to one or more first computing devices (104), and the one or more second computing devices (108) may not be restricted to the mentioned devices and various other devices may be used. A smart computing device may be one of the appropriate systems for storing data and other private/sensitive information.

In an example embodiment, the data quality module (110) or the centralized server (112) may include one or more processors coupled with a memory, wherein the memory may store instructions which when executed by the one or more processors may cause the system to access content stored in a network.

In another example embodiment, the centralized server (112) may include or comprise, by way of example but not limitation, one or more of: a cloud based server, a standalone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

Figure 2:
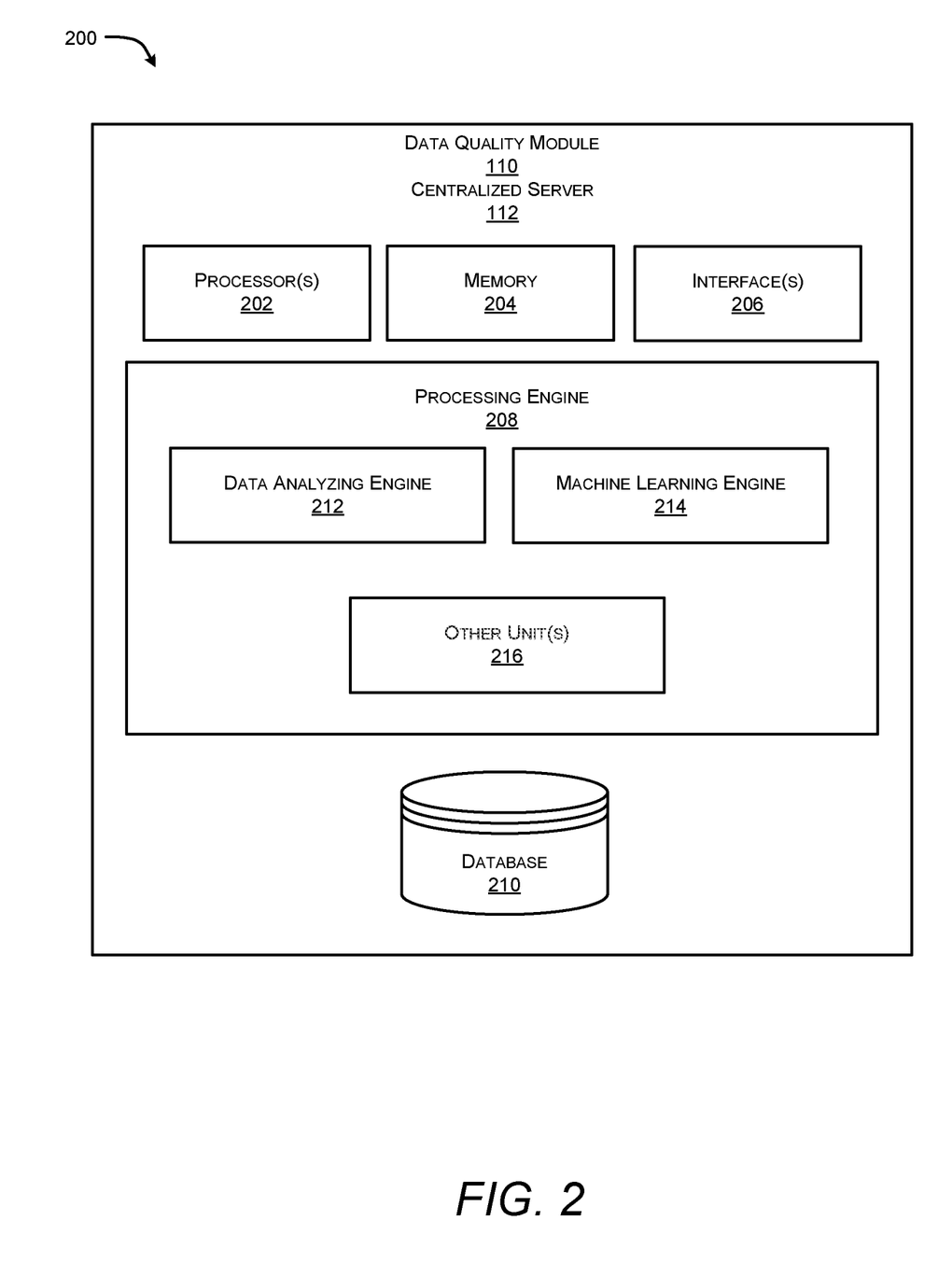
FIG. 2 illustrates a representation of data quality module/centralized server for determining ADQM in a network, according to an example embodiment of the present disclosure.

FIG. 2 with reference to FIG. 1, illustrates an example representation of data quality module (110)/centralized server (112) for facilitating real time automotive data feeds, in accordance with an embodiment of the present disclosure. In an aspect, the data quality module (110)/centralized server (112) may comprise one or more processor(s) (202). The one or more processor(s) (202) may be implemented as one or more microprocessors, microcomputers, microcontrollers, cloud-based processors, digital signal processors, central processing units, logic circuitries, and/or any devices that process data based on operational instructions. Among other capabilities, the one or more processor(s) (202) may be configured to fetch and execute computer-readable instructions stored in a memory (206) of the data quality module (110). The memory (206) may be configured to store one or more computer-readable instructions or routines in a non-transitory computer readable storage medium, which may be fetched and executed to create or share data packets over a network service. The memory (206) may comprise any non-transitory storage device including, for example, volatile memory such as RAM, or non-volatile memory such as EPROM, flash memory, and the like.

In an embodiment, the data quality module (110)/centralized server (112) may include an interface(s) 204. The interface(s) 204 may comprise a variety of interfaces, for example, interfaces for data input and output devices, referred to as I/O devices, storage devices, and the like. The interface(s) 204 may facilitate communication of the data quality module (110). The interface(s) 204 may also provide a communication pathway for one or more components of the data quality module (110) or the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the data quality module (110)/centralized server (112) may comprise the machine-readable storage medium storing the instructions and the processing resource to execute the instructions, or the machine-readable storage medium may be separate but accessible to the data quality module (110)/centralized server (112) and the processing resource. In other examples, the processing engine(s) (208) may be implemented by electronic circuitry.

The processing engine (208) may include one or more engines selected from any of a data acquisition engine (212), a machine learning (ML) engine (214), and other engines (216).

The data acquisition engine (212) may be responsible for collecting specific automotive data at a specific frequency and in specific quantity/numbers. The ML engine (214) may be configured to extract a first and a second set of attributes from the set of data packets received from the first computing devices (104) associated with the plurality of automotive (102). The first set of attributes may pertain to automotive numeric data set while the second set of attributes pertain to automotive image data set. Based on the first and the second set of attributes extracted, the ADQM may be calculated by the ML engine (214). the ML engine (214) may further generate a training dataset that must be representative of all the possible combinations of criterion driving the overall quality of the trip data. The 'numeric and the image training data may be collected for a plurality of trips covering various type of vehicles with different duration of the trips. The training dataset may further include different modes of collection such as real-time, batch, historical and mixed and the like, various combinations of data signals at varying frequencies (30 sec to 300 sec), personalized and aggregated data. The training data set must contain data for trips with personal information as well as trips with anonymised data.

Figure 3:
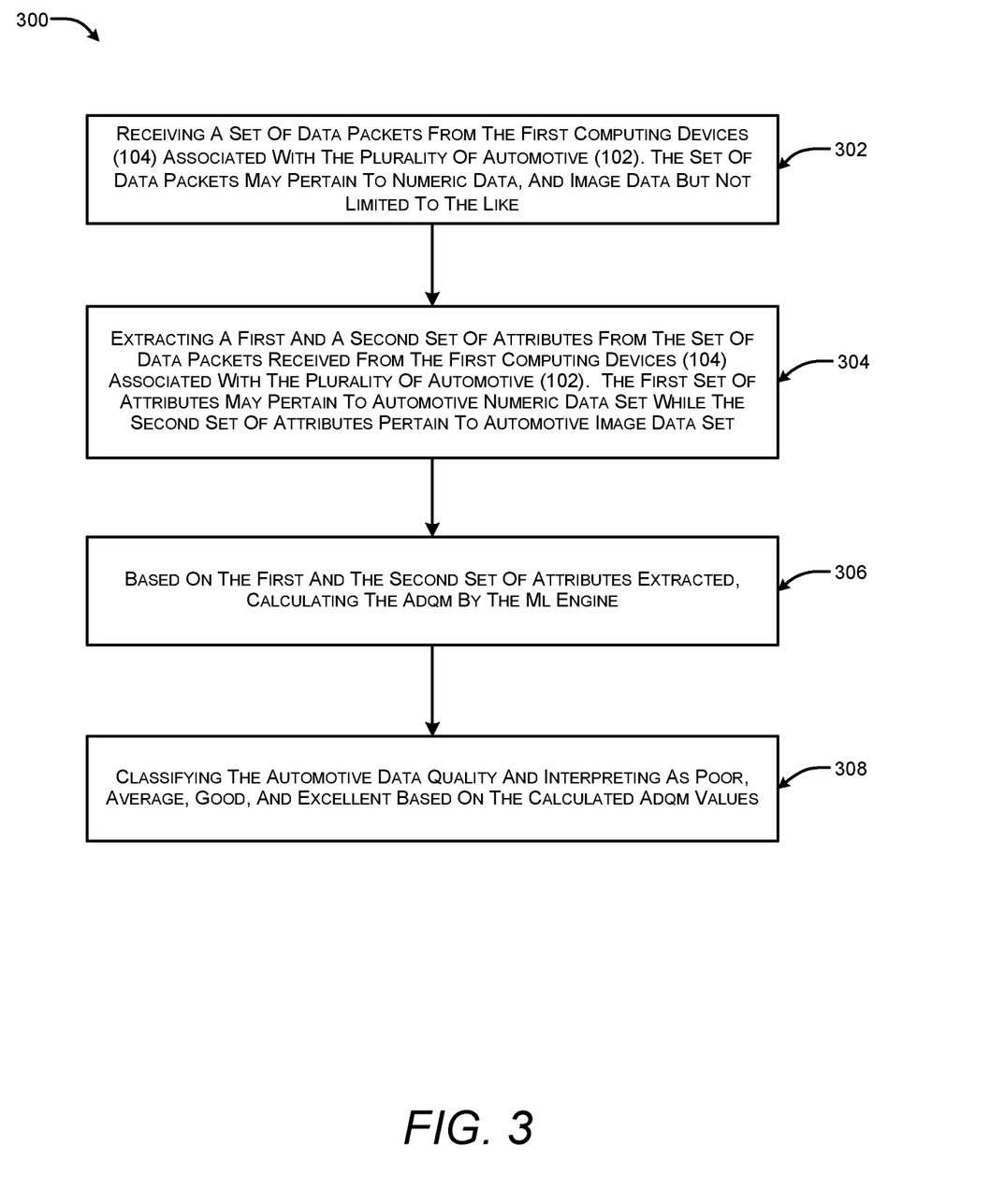
FIG. 3 illustrates a representation of a proposed method associated with the data quality module, according to an example embodiment of the present disclosure.

FIG. 3 illustrates an example representation of a proposed method associated with the data quality module, in accordance with an embodiment of the present disclosure. According to an aspect, the method (300) for creating an Automotive data Quality Marker (ADQM) to measure the quality of automotive data generated from a plurality of data sources may include the step 302 of receiving a set of data packets from the first computing devices (104) associated with the plurality of automotive (102). The set of data packets may pertain to numeric data, and image data but not limited to the like. The method may include the step 304 of extracting a first and a second set of attributes from the set of data packets received from the first computing devices (104) associated with the plurality of automotive (102). The first set of attributes may pertain to automotive numeric data set while the second set of attributes pertain to automotive image data set. Based on the first and the second set of attributes extracted, the method may further include the step 306 of calculating the ADQM by the ML engine (214).

The method (300) may further include predicting and classifying ADQM based on a training dataset generated that must be representative of all the possible combinations of criterion driving the overall quality of the trip data.

Figure 4:
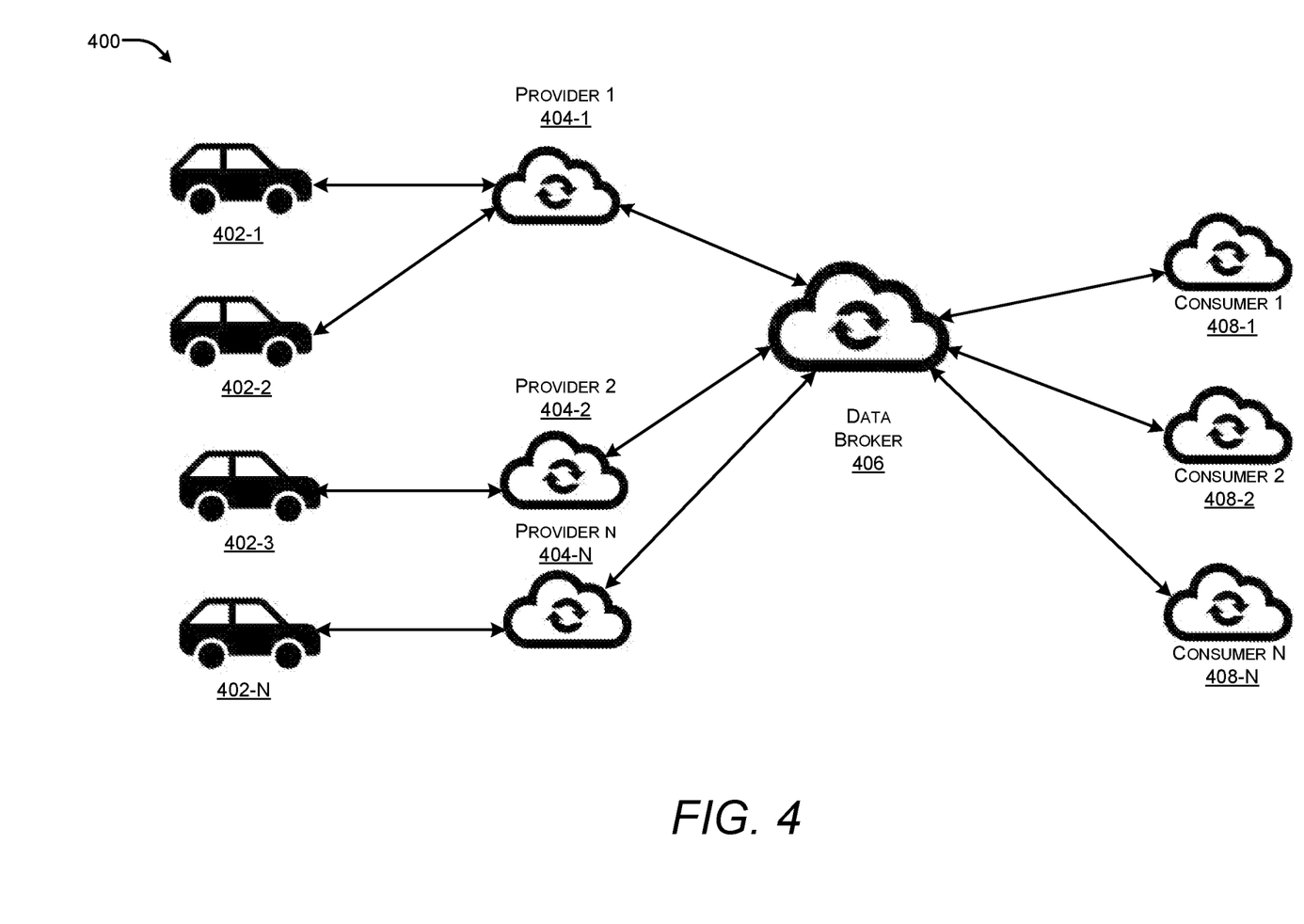
FIG. 4 illustrates a representation of an overall system configuration, according to an example embodiment of the present disclosure.

FIG. 4 illustrates an example representation of an overall system configuration, in accordance with an embodiment of the present disclosure.

As illustrated, the overall system may include automotive data signals being collected to and from a plurality of vehicles (402-1, 402-2, . . . 402-N) from a plurality of providers (404-1, 404-2, . . . 404-N) communicatively coupled to a data broker (406) and a plurality of consumers (408-1, 408-2 . . . 408-N).

Figure 5A:
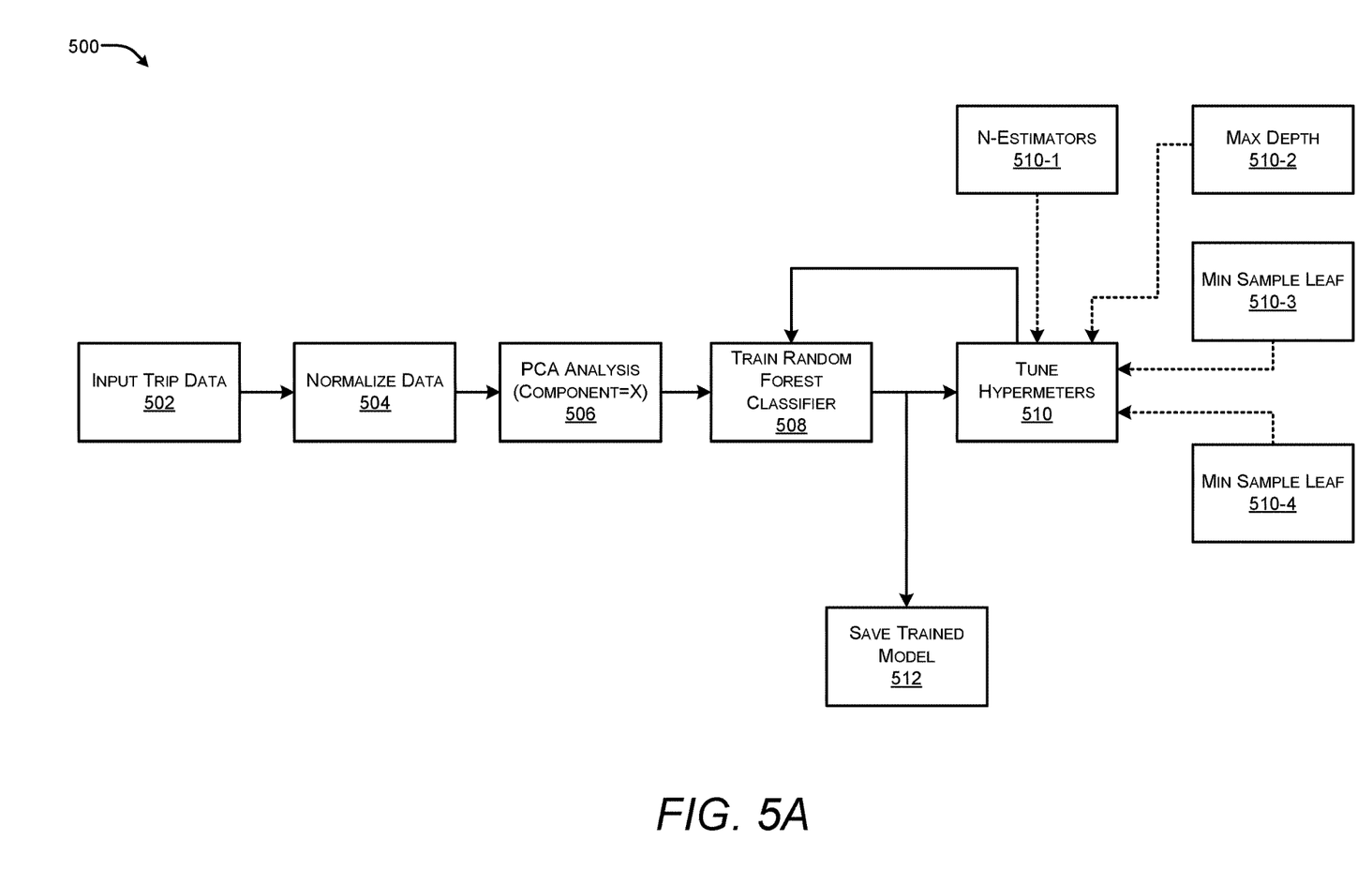
FIG. 5A illustrates an example representation of a block diagram highlighting model training for trip Numeric data Quality Marker (NDQM) in accordance with an embodiment of the present disclosure.

FIG. 5A illustrates an example representation of a block diagram highlighting model training for trip Numeric data Quality Marker (NDQM) in accordance with an embodiment of the present disclosure. As illustrated, in an aspect, input trip data (502) may be collected. As the number of signals in automotive is high (500+), PCA may be used for dimensionality reduction as not all signals impact the data quality. The input data may be then normalized (504) by applying the PCA (506), selecting the optimal number of components=100 and get the eigen vectors. The Eigen vectors may be arranged along with corresponding the eigen values in descending order of the eigen values. A cumulative eigen value graph may be plotted. In an example embodiment, the eigen vectors with least contribution to total eigen values may be removed from the analysis.

In an example embodiment, the normalized data may be transformed using selected the eigen vectors after PCA analysis. The NDQM prediction may be multi-class prediction. For example, the NDQM has at least 4 possible values. Hence, a Random Forest classifier (508) may be trained for classifying the data. The PCA enables faster convergence of Random Forest Classifier as it reduces the data dimensionality. The Random Forest classifier may be trained with Bootstrap using the Transformed data after PCA analysis.

The following hyper-parameters (510) has been used to tune the model created using the Random Forest classifier
n_estimators (510-1): Tested the model with a range of n_estimators max_depth (510-2): the max number of "splits"
min_samples_split (510-3): the minimum number of observations required before node split
min_samples_leaf (510-4): the minimum number of observations required at each leaf at the ends of each tree.

In an example embodiment, the model may be trained using different combinations of hyper-parameters with an accuracy of above 90% to predict NDQM of each trip data.

Figure 5B:
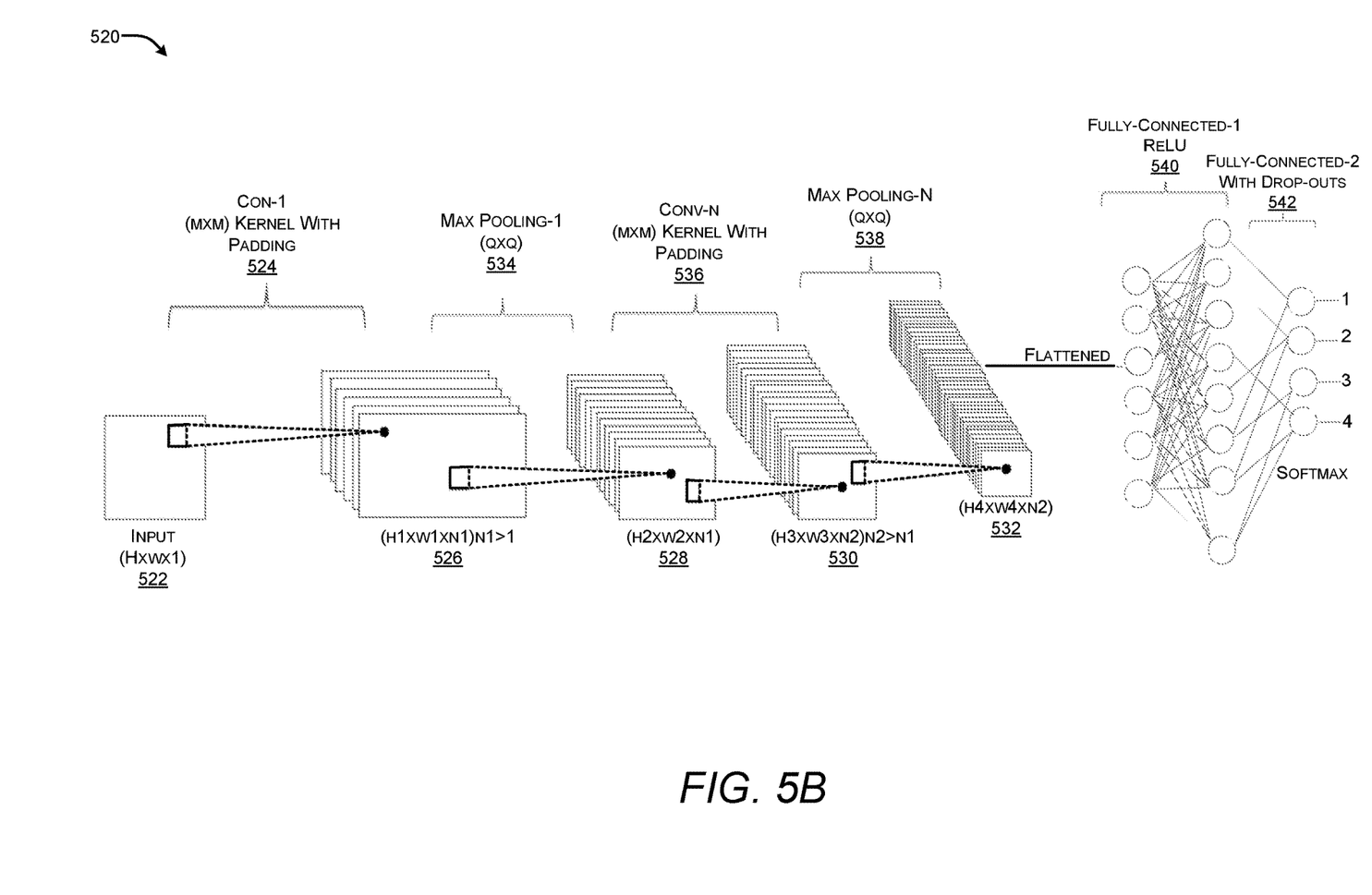
FIG. 5B illustrates an example representation of a block diagram highlighting a convolutional neural network (CNN) model in accordance with an embodiment of the present disclosure.

FIG. 5B illustrates an example representation of a block diagram highlighting a convolutional neural network (CNN) model in accordance with an embodiment of the present disclosure. As illustrated, creating and training CNN Model for Image Data Quality Marker (IDQM) may be created with hidden layers enabled with Max-Pooling (534) and Batch Normalization but not limited to it. The input image data may have a pixel of (h×w×1) (522) where
h×w→height and width of the image
n→number of channels, since we use 2-D gray scale images initial value is 1
m→kernel size
q→pool parameter for max-pooling In an example embodiment, optimized values of a plurality of parameters may be selected to achieve accuracy of at least 90-95% but not limited to it. Accuracy of data quality is the key for deriving data value. The following are the key parameters needed to achieve accuracy:
Input image size to ensure maximum coverage of data points
Number of Convolutional layers
Kernel size (m) and pool size (q) for featurization In an example embodiment, the trip data may be converted into one or more 2-D images of h×w size with channel=1 but not limited to it. Subsequently, the trip data passes through a series of Convolution layers (524) followed Max-Pool layers for featurization (534).

In an example embodiment, batch normalization may be used between the convolutional layers to standardize the inputs and reduce the training time. Once the image is completely flattened, the image data passes through fully-connected layers with drop-outs (540). A softmax function but not limited to it may be applied to classify the image/data to possible IDQM category.

Automotive dataset is a collection of trip data. The trip data may be further classified as signal Data and Image data.

In an example embodiment, quality prediction for new data set and to derive quality marker for the new dataset, the quality markers for each trip data may include the steps of
Predicting NDQM for numeric trip data
Predicting IDQM for each image data of the trip, if available.
Calculating average IDQM value $$IDQM = \Sigma IDQM_{ij},$$

where $IDQM_{ij}$ represents the data quality value predicted for $j^{th}$ trip image of the $i^{th}$ trip, n is the number of images in the $i^{th}$ trip
Calculating an overall Trip Data Quality Marker (TDQM) as follows $$TDQM = W_{NDQM} * NDQM + W_{IDQM} * IDQM$$

where $W_{NDQM}$ and $W_{IDQM}$ is the weight assigned to numeric and image data respectively and is based on the use case.

In an embodiment, an aggregated ADQM may be created using the TDQM generated for the Trip data, and an average function to create an overall ADQM for a specific set of trip data to quantify the quality of that dataset may be given by $$ADQM = \frac{\sum TDQM_i}{N},$$

where TDQM represents the data quality marker predicted for $i^{th}$ trip of the dataset, N is the total number of trips in dataset.

In a way of example but not as a limitation, the Automotive Data Quality Marker (ADQM) may be interpreted as
   ADQM<=1, implies data quality is "Poor" and cannot be used for any further analysis. Hence, it shall be discarded.
   1<ADQM<=2, implies data quality is "Average" and may be useful for use cases, where need basis sparse data is required
   2<ADQM<=3 implies data quality is "Good" and can be used for generating insights and track necessary events
   3<ADQM<=4 implies data quality is "Excellent" and provides the necessary information at a required frequency.

Figure 6:
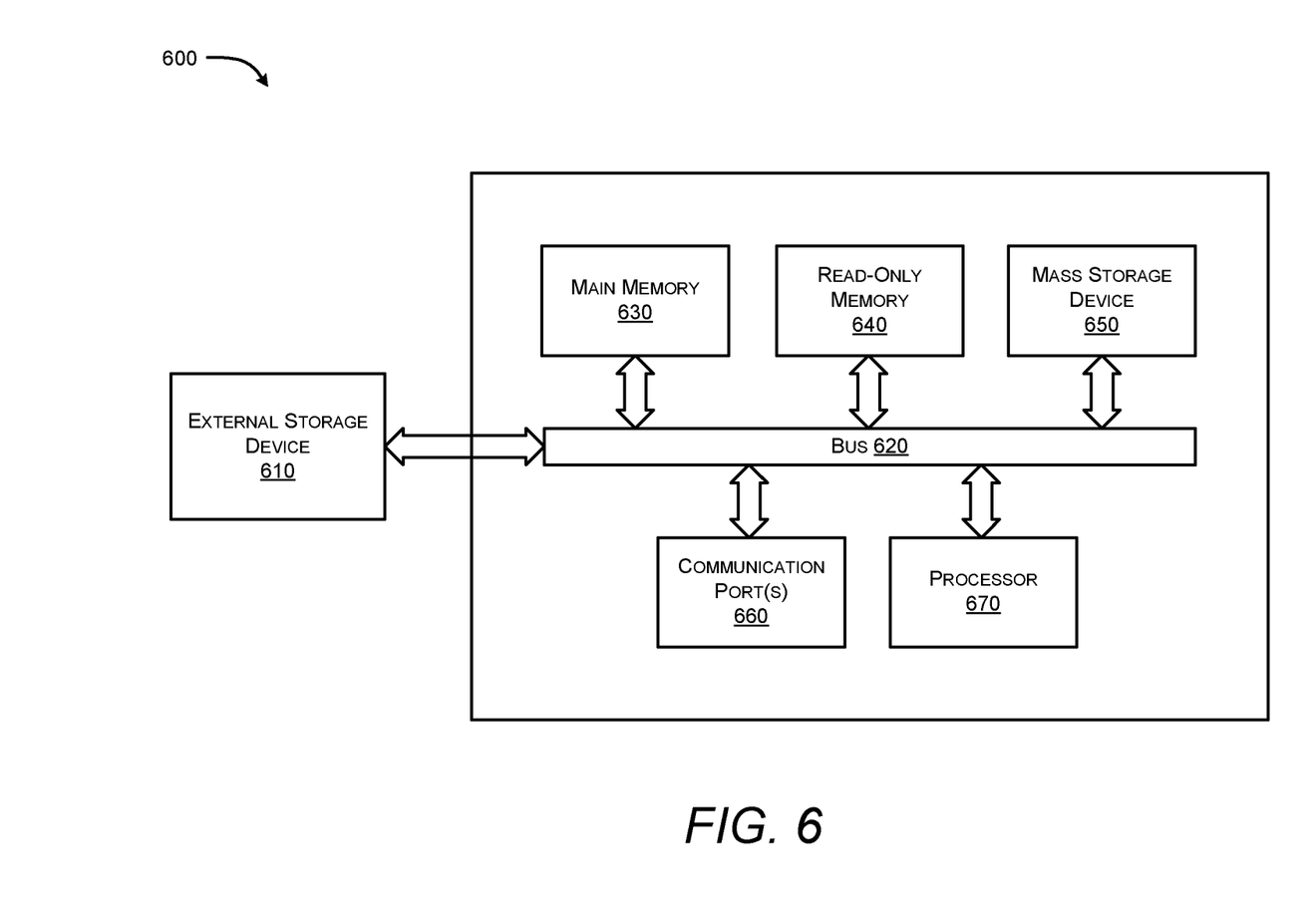
FIG. 6 illustrates a computer system in which or with which embodiments of the present invention can be utilized according to example embodiments of the present disclosure.

FIG. 6 illustrates an example computer system in which or with which embodiments of the present invention can be utilized in accordance with example embodiments of the present disclosure. As shown in FIG. 6, computer system 600 can include an external storage device 610, a bus 620, a main memory 630, a read only memory 640, a mass storage device 650, communication port 660, and a processor 670. A person skilled in the art will appreciate that the computer system may include more than one processor and communication ports. Examples of processor 670 include, but are not limited to, an Intel® Itanium® or Itanium 2 processor(s), or AMD® Opteron® or Athlon MP® processor(s), Motorola® lines of processors, FortiSOC™ system on chip processors, cloud-based processors or other future processors. Processor 660 may include various modules associated with embodiments of the present invention. Communication port 660 can be any of an RS-232 port for use with a modem-based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects. Memory 630 can be Random Access Memory (RAM), or any other dynamic storage device commonly known in the art. Read-only memory 640 can be any static storage device(s) e.g., but not limited to, a Programmable Read Only Memory (PROM) chips for storing static information e.g., start-up or BIOS instructions for processor 670. Mass storage 650 may be any current or future mass storage solution, which can be used to store information and/or instructions. Example mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 6K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couple processor(s) 670 with the other memory, storage and communication blocks. Bus 620 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 660 to software system.

Optionally, operator and administrative interfaces, e.g. a display, keyboard, and a cursor control device, may also be coupled to bus 620 to support direct operator interaction with a computer system. Other operator and administrative interfaces can be provided through network connections connected through communication port 660. The external storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned example computer system limit the scope of the present disclosure.

Thus, the present disclosure provides a unique and inventive solution for defining quantifiable quality criteria for automotive data and encapsulates the need to spread across data providers and consumers alike. The machine learning engine enables automatic detection of important features in the data without any human intervention. Both numeric and image data quality can be derived using this method. The ADQM can be used to evaluate the quality of automotive data for any source of data irrespective of format and mode of data.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. An auto generating automotive data quality marker (ADQM) system, comprising:
   a plurality of Distributed Source Systems associated with a plurality of automotive data sources;
   a plurality of Distributed Storage Systems to store a set of data packets pertaining to any or a combination of numeric data generated in a vehicle during a trip and image dataset for images captured through a dashboard camera during the trip;
   a processor;
   a data quality module coupled to the processor, the data quality module to:
      receive the set of data packets from the distributed storage systems, wherein the set of data packets is received at a specific frequency and in specific quantity/numbers;
   a Machine learning (ML) engine coupled to the processor, the ML engine to:
      extract a first set of attributes from the set of data packets received from first computing devices associated with the plurality of automotive data sources, wherein the first set of attributes pertains to automotive numeric data set;
      extract a second set of attributes from the set of data packets received from the first computing devices associated with the plurality of automotive data sources, wherein the second set of attributes pertains to automotive image data set;

based on the first and the second set of attributes extracted, determine, an average score pertaining to quality of data in the set of data packets received, wherein the average score comprises the automotive data quality marker (ADQM);

classify, based on the ADQM, the set of data packets related to one or more automobiles among one or more pre-defined categories for quality marking, wherein the ML engine combines supervised and unsupervised learning for predicting numeric data quality by using Numeric Data Quality Marker (NDQM), and wherein the ML engine further combines a convolution neural network (CNN) model for predicting image data quality by using Image Data Quality Marker (IDQM).

2. The system as claimed in claim 1, wherein the ML engine combines the Numeric Data Quality Marker (NDQM) and the Image Data Quality Marker (IDQM) to calculate a Trip Data Quality Marker (TDQM) based on a predefined set of parameters.

3. The system as claimed in claim 1, wherein the ML engine classifies the ADQM calculated into the one or more predefined categories based on a predefined scale according to a predefined set of instructions.

4. The system as claimed in claim 1, wherein the ML engine is configured to use CNN modes for deriving the data quality marker for the image data, wherein the quality for numeric trip data is predicted using Linear regression, logistic regression, Naive Bayes, kNN, random forest, Principle Component Analysis (PCA) and a combination thereof.

5. The system as claimed in claim 1, wherein the data quality module updates a database every time and checks for an end-to-end data completeness for each data pipeline associated with the set of data packets.

6. The system as claimed in claim 1, wherein the key data features comprises automotive data pertaining to an overall trip data, vehicle profile, driver profile, driving pattern, safety data, media data, critical events, vehicle health, driver behavior and a combination thereof.

7. The system as claimed in claim 1, wherein the data mode comprises of data collected and shared in real-time, batch, historical or a combination thereof.

8. The system as claimed in claim 1, wherein the data validity comprises data boundary checks to remove out of bound values, signal correlation and dependency.

9. The system as claimed in claim 1, wherein the data skewness comprises balanced data to draw inferences from trip duration, vehicle types, driver Profile, location and a combination thereof.

10. A method facilitating auto generating automotive data quality marker, said method comprising:

receiving, by a data quality module coupled to a processor, a set of data packets from a plurality of distributed storage systems associated with a plurality of automotive data sources, wherein the set of data packets is received at a specific frequency and in specific quantity/numbers;

extracting, by a Machine learning (ML) engine coupled to the processor, a first set of attributes from the set of data packets received from a plurality of first computing devices associated with the plurality of automotive data sources, wherein the first set of attributes pertain to automotive numeric data set;

extracting, by the ML engine coupled to the processor, a second set of attributes from the set of data packets received from the first computing devices associated with the plurality of automotive data sources, wherein the second set of attributes pertain to automotive image data set; and based on the first and the second set of attributes extracted, determining, by the ML engine, an average score pertaining to quality of data in the set of data packets received, wherein the average score comprises the automotive data quality marker (ADQM);

classifying, based on the ADQM, the set of data packets related to the one or more automobiles among one or more pre-defined categories for quality marking; and combining, by the ML engine, supervised and unsupervised learning for predicting numeric data quality by using Numeric data Quality Marker (NDQM), and a convolution neural network (CNN) model for predicting image data quality by using Image Data Quality Marker (IDQM).

11. The method as claimed in claim 10, wherein the method comprises combining by the ML engine, the Numeric Data Quality Marker (NDQM) and the Image Data Quality Marker (IDQM) to calculate a Trip Data Quality Marker (TDQM) based on a predefined set of parameters.

12. The method as claimed in claim 10, wherein the method further comprises:

classifying by the ML engine, the ADQM calculated into the one or more predefined categories based on a predefined scale according to a predefined set of instructions.

13. The method as claimed in claim 10, wherein the key data features comprises automotive data pertaining to an overall trip data, vehicle profile, driver profile, driving pattern, safety data, media data, critical events, vehicle health, driver behavior and a combination thereof.

14. The method as claimed in claim 10, wherein the data mode comprises of data collected and shared in real-time, batch, historical or a combination thereof.

15. The method as claimed in claim 10, wherein the data validity comprises data boundary checks to remove out of bound values, signal correlation and dependency.

16. A non-transitory computer readable medium comprising machine executable instructions that are executable by a processor to:

receive, by a data quality module coupled to the processor, a set of data packets from a plurality of distributed storage systems associated with a plurality of automotive data sources, wherein the set of data packets is received at a specific frequency and in specific quantity/numbers;

extract by a Machine learning (ML) engine coupled to the processor, a first set of attributes from the set of data packets received from a plurality of first computing devices associated with the plurality of automotive data sources, wherein the first set of attributes pertain to automotive numeric data set;

extract, by the ML engine coupled to the processor, a second set of attributes from the set of data packets received from the first computing devices associated with the plurality of automotive data sources, wherein the second set of attributes pertain to automotive image data set;

based on the first and the second set of attributes extracted, determine, by the ML engine, an average score pertaining to quality of data in the set of data packets received, wherein the average score comprises the automotive data quality marker (ADQM);

classify, based on the ADQM, the set of data packets related to the one or more automobiles among one or more pre-defined categories for quality marking; and combine, by the ML engine, supervised and unsupervised learning for predicting numeric data quality by using Numeric data Quality Marker (NDQM), and a convolution neural network (CNN) model for predicting image data quality by using Image Data Quality Marker (IDQM).

17. The non-transitory computer readable medium as claimed in claim 16, wherein the ML engine combines the Numeric Data Quality Marker (NDQM) and the Image Data Quality Marker (IDQM) to calculate a Trip Data Quality Marker (TDQM) based on a predefined set of parameters.

* * * * *